United States Patent [19]
Beyer et al.

[11] Patent Number: 5,944,049
[45] Date of Patent: Aug. 31, 1999

[54] APPARATUS AND METHOD FOR REGULATING A PRESSURE IN A CHAMBER

[75] Inventors: Christian Beyer, Cologne, Germany; Keith Trenton, San Jose, Calif.; Mariusch Gregor; Robert Stolle, both of Cologne, Germany; Rudolph Bahnen, Roedgen, Germany; Anja Plugge, Solingen, Germany; Heinz Frings, Cologne, Germany; Karl-Heinz Ronthaler, Zuelpich, Germany; Dennis Smith, San Jose; Jayesh Patel, Fremont, both of Calif.

[73] Assignees: Applied Materials, Inc., Santa Clara, Calif.; Leybold Vacuum GmbH, Cologne, Germany

[21] Appl. No.: 08/893,032

[22] Filed: Jul. 15, 1997

[51] Int. Cl.$^6$ .............................. F16K 31/12; F17D 1/16; E03B 25/09
[52] U.S. Cl. ..................... 137/487.5; 137/14; 137/907
[58] Field of Search ..................... 137/14, 907, 487.5; 141/8

[56] References Cited

U.S. PATENT DOCUMENTS

| | | | |
|---|---|---|---|
| 2,336,968 | 12/1943 | Smith | 137/907 |
| 3,985,467 | 10/1976 | Lefferson . | |
| 4,172,477 | 10/1979 | Reich | 141/8 |
| 4,181,161 | 1/1980 | Kraus | 141/8 |
| 4,259,038 | 3/1981 | Jorgensen et al. . | |
| 4,699,570 | 10/1987 | Bohn . | |
| 4,934,399 | 6/1990 | Cho | 137/14 |
| 5,039,280 | 8/1991 | Saulgeot et al. . | |
| 5,340,295 | 8/1994 | Preiato et al. . | |
| 5,433,238 | 7/1995 | Cannizzaro et al. | 137/14 |
| 5,719,609 | 2/1998 | Hauck et al. | 137/907 |

FOREIGN PATENT DOCUMENTS

| | | | |
|---|---|---|---|
| 0 343 9145 | 11/1989 | European Pat. Off. . | |
| 81252 | 12/1971 | German Dem. Rep. . | |
| 2235739 | 4/1973 | Germany | 137/907 |
| 38 28 608 | 3/1990 | Germany . | |
| 3828608 | 8/1990 | Germany . | |
| 58-124079 | 7/1983 | Japan . | |
| 62-78615 | 4/1987 | Japan . | |
| 7-058032 | 3/1995 | Japan . | |
| 2-717236 | 11/1997 | Japan . | |

*Primary Examiner*—Denise L. Ferensic
*Assistant Examiner*—Joanne Y. Kim
*Attorney, Agent, or Firm*—Venable; Robert Kinberg; Michael A. Sartori

[57] ABSTRACT

A pressure for a chamber is regulated by controlling either the exhaust pressure at the exhaust side of a first vacuum pump or the internal pressure at a compression stage of the first vacuum pump, where the first vacuum pump is directly communicating with the chamber. The pressure of the chamber can be regulated by combinations of the following: controlling the variable rotational frequency of a roots vacuum pump, a pre-vacuum pump, or a high compression pump; controlling a control valve between a pre-vacuum pump and the first vacuum pump; controlling a control valve for injecting gas into the exhaust side of the first vacuum pump or into the compression stage of the first vacuum pump; and controlling a control valve or control valves for bypassing the first vacuum pump or a compression stage or compression stages of the first vacuum pump. To regulate the pressure in the chamber, several types of control rules can be used, including: a PID control rule, a gain scheduler, and a threshold comparison control rule.

43 Claims, 14 Drawing Sheets

APPARATUS AND METHOD FOR REGULATING A PRESSURE IN A CHAMBER

BACKGROUND OF THE INVENTION

The invention relates generally to an apparatus and a method for regulating a pressure in a chamber.

In FIG. 1, a prior art system is shown for generating a vacuum in a chamber, such as that used in the manufacturing or processing of semiconductor products, such as devices and wafers. The chamber 1 has a process gas injected at a flow rate of QHv. The pressure PHv in the chamber 1 is measured with the gauge or sensor 5, which generates the pressure signal P. To generate a high vacuum in the chamber 1, the intake side of a high vacuum pump 2 is coupled to the chamber 1. Typically, a turbo molecular pump is used as the high vacuum pump 2. Further, the intake side of a roots vacuum pump 3, which is a type of rotary blower, is coupled to the exhaust side of the high vacuum pump 2, and the exhaust side of the roots vacuum pump 3 is coupled to the intake side of a pre-vacuum pump 4.

In the prior art system of FIG. 1, the pressure PHv of the chamber 1 is regulated using the throttle valve 8. The pressure signal P corresponds to the pressure PHv of the chamber 1 measured with the gauge or sensor 5. Based on the pressure signal P, the system operator 6 manually or automatically determines a desired set point pressure for the chamber 1 and generates a set pressure signal Ps corresponding to the desired set point pressure. The set point pressure signal Ps is used by the controller 7 to generate a signal u, which is used to vary the cross-section of the throttle valve 8. In so doing, the pressure PHv of the chamber 1 is regulated, and a high vacuum within chamber 1 is achieved.

SUMMARY OF THE INVENTION

It is an object of the present invention to decrease the dimensions and, specifically, the footprint of the chamber by eliminating the throttle valve of the prior art system.

A further object of the present invention is to increase the conductance, which is mass flow divided by a pressure difference or drop over a distance, of the chamber by eliminating the throttle valve of the prior art system. In this way, a higher pumping speed for the high vacuum pump is obtained, and a smaller and more cost effective high vacuum pump may be used for some applications.

Still a further object of the present invention is to increase the throughput of the system, especially one used of semiconductor manufacturing and processing, by eliminating the throttle valve. Because the throttle valve is a source of impurities and particles in the chamber, the throttle valve must be cleaned regularly. This requires stopping the production process and opening the chamber to clean the system.

An additional object of the present invention is to increase the overall reliability of the system by eliminating the throttle valve, which is typically an unreliable mechanical part. For a chamber used in the manufacturing and processing of semiconductor products, this increase in reliability is especially desirable.

Another object of the present invention is to decrease the time required to obtain a desired pressure and vacuum in the chamber, and thereby increasing the manufacturing throughput of the chamber. For example, if the chamber is used for manufacturing or processing of semiconductor products, the throughput of the semiconductor products can be improved.

Yet another object of the present invention is to homogenize the flow between the high vacuum pump and the chamber.

Still yet another object of the present invention is to influence insignificantly the composition of the process gas entering the chamber.

The above objects and advantages of the present invention are achieved by an apparatus and a method for regulating a pressure in a chamber. The apparatus for regulating the pressure in the chamber comprises: a first vacuum pump having a compression stage, an exhaust side, and an intake side communicating directly with the chamber for generating a first pressure in the chamber; a controllable pressure regulator coupled to the first vacuum pump and having a control input for receiving a first signal for regulating an exhaust pressure at the exhaust side of the first vacuum pump or an internal pressure at the compression stage of the first vacuum pump, and to thereby regulate the pressure in the chamber; and a controller having an input for receiving a second signal representing a control pressure in the apparatus, and an output connected to the control input of the controllable pressure regulator, the controller producing at the output the first signal as a function of the second signal.

The method for regulating a pressure in the chamber, wherein a first vacuum pump has a compression stage, an exhaust side, and an intake side communicating directly with the chamber, comprises the steps of: generating a first pressure in the chamber with the first vacuum pump; and controlling an exhaust pressure at the exhaust side of the first vacuum pump or an internal pressure at the compression stage of the first vacuum pump as a function of a control pressure in the apparatus to thereby regulate the pressure in the chamber.

Moreover, the above objects and advantages of the present invention are illustrative, and not exhaustive, of those which can be achieved by the present invention. Thus, these and other objects and advantages of the present invention will be apparent from the description herein or can be learned from practicing the invention, both as embodied herein and as modified in view of any variations which may be apparent to those skilled in the art.

BRIEF DESCRIPTION OF THE INVENTION

Figure 4:
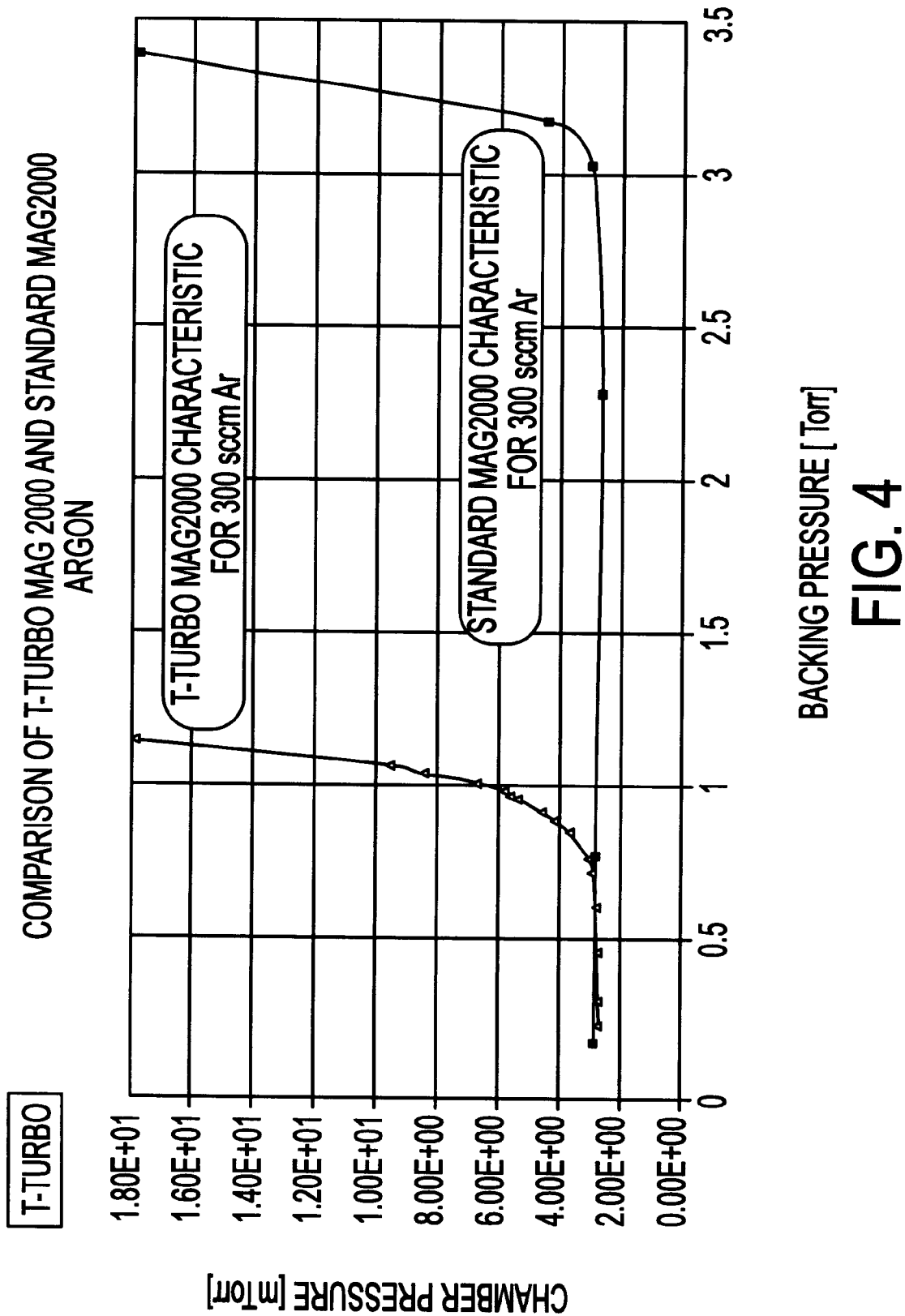

FIG. 4 compares the compression characteristics of the prior art system and the first embodiment of the present invention.

Figure 5:
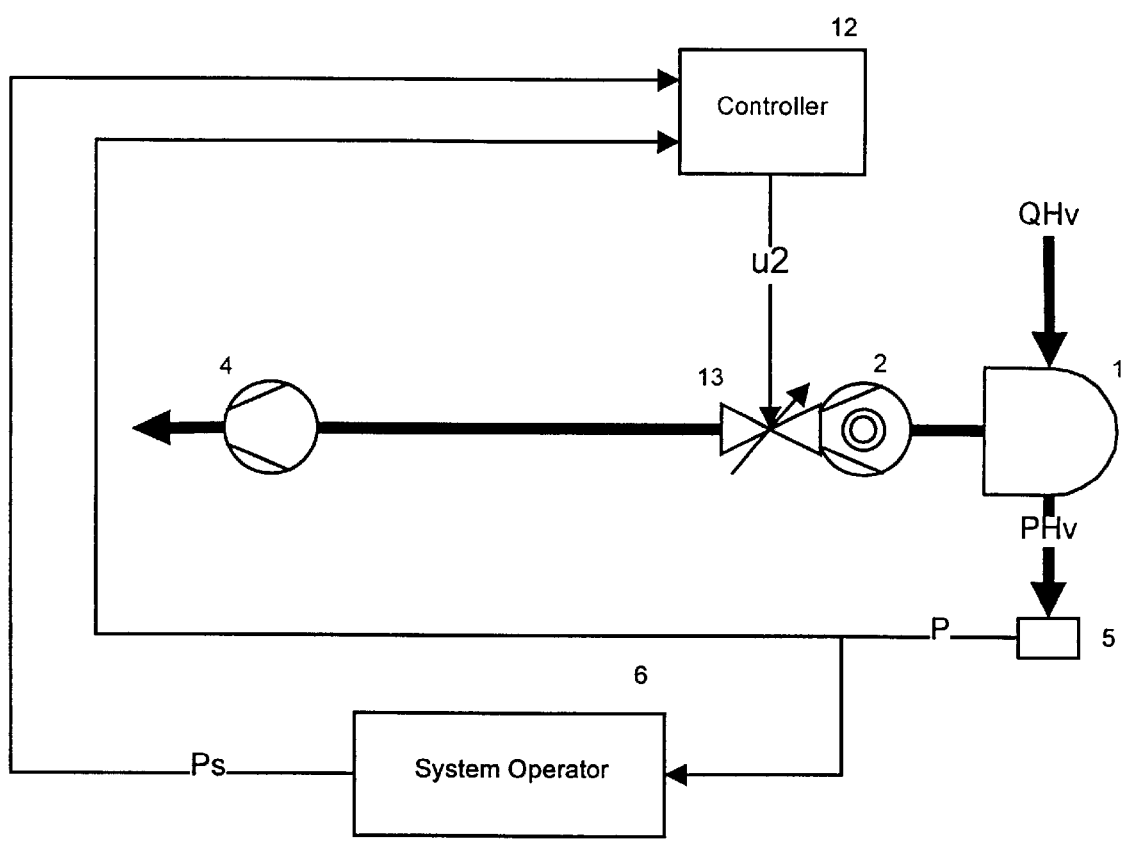

FIG. 5 is a function block diagram illustrating a second embodiment of the invention.

Figure 6:
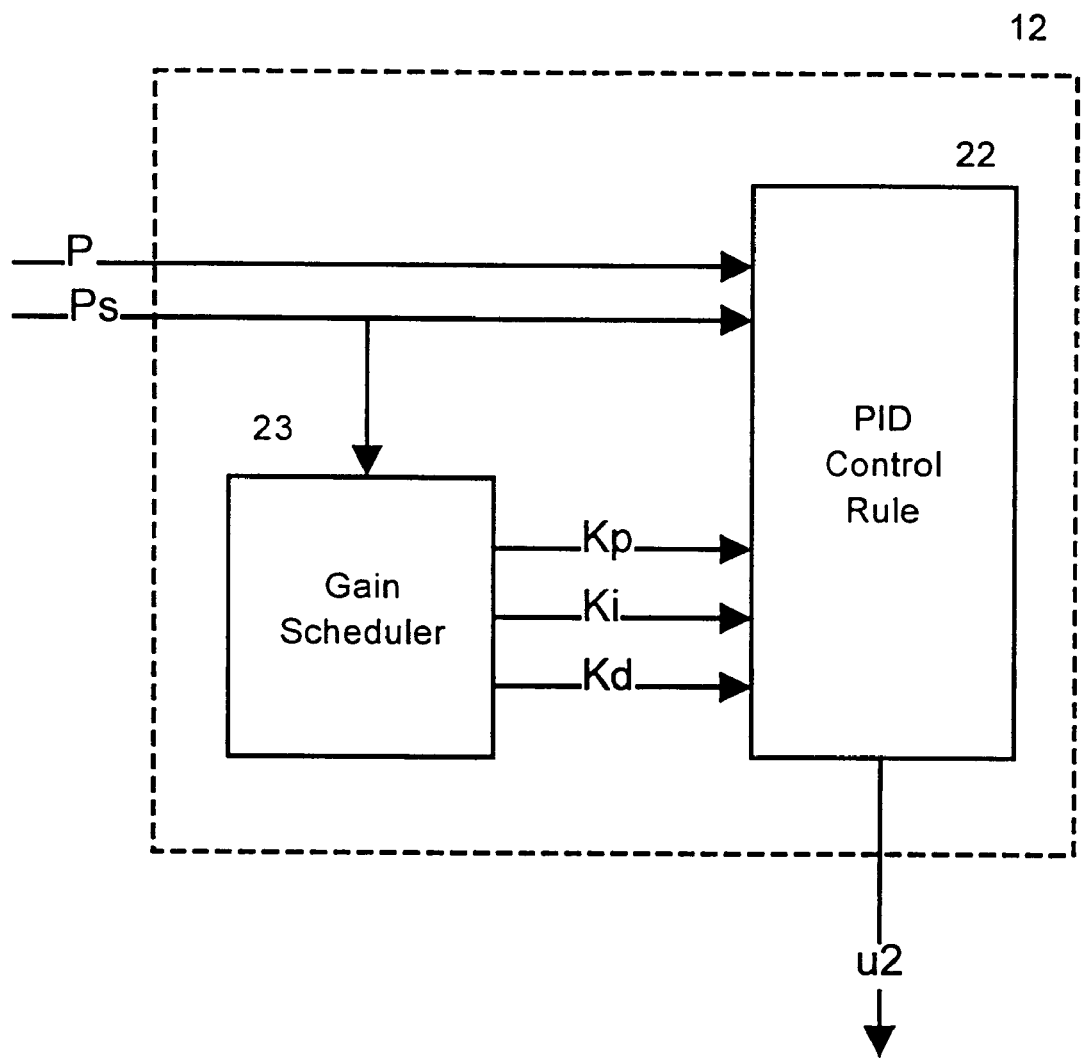

FIG. 6 is a function block diagram illustrating the controller 12 of FIG. 5.

Figure 7:
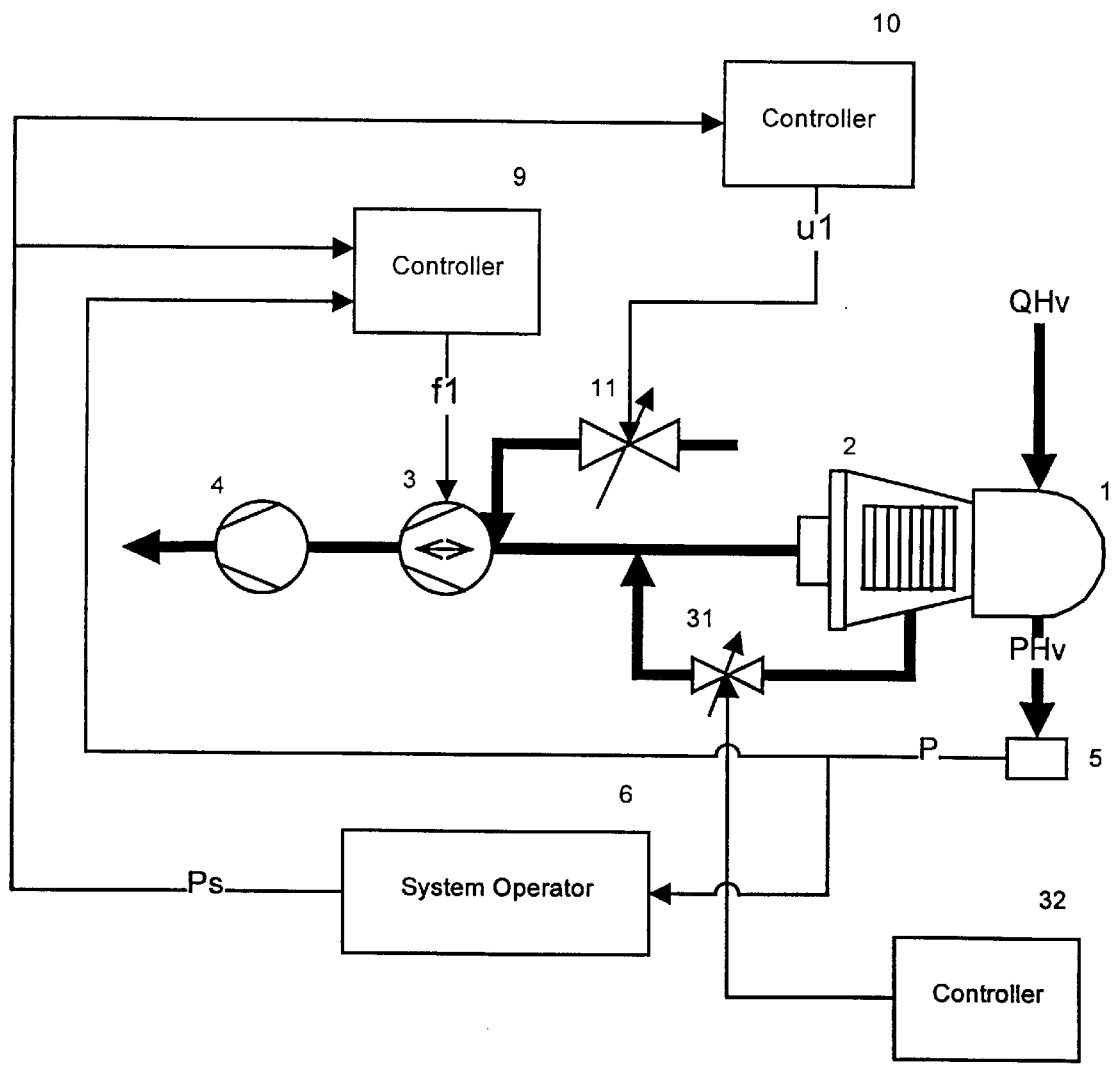

FIG. 7 is a function block diagram illustrating a third embodiment of the invention.

Figure 8:
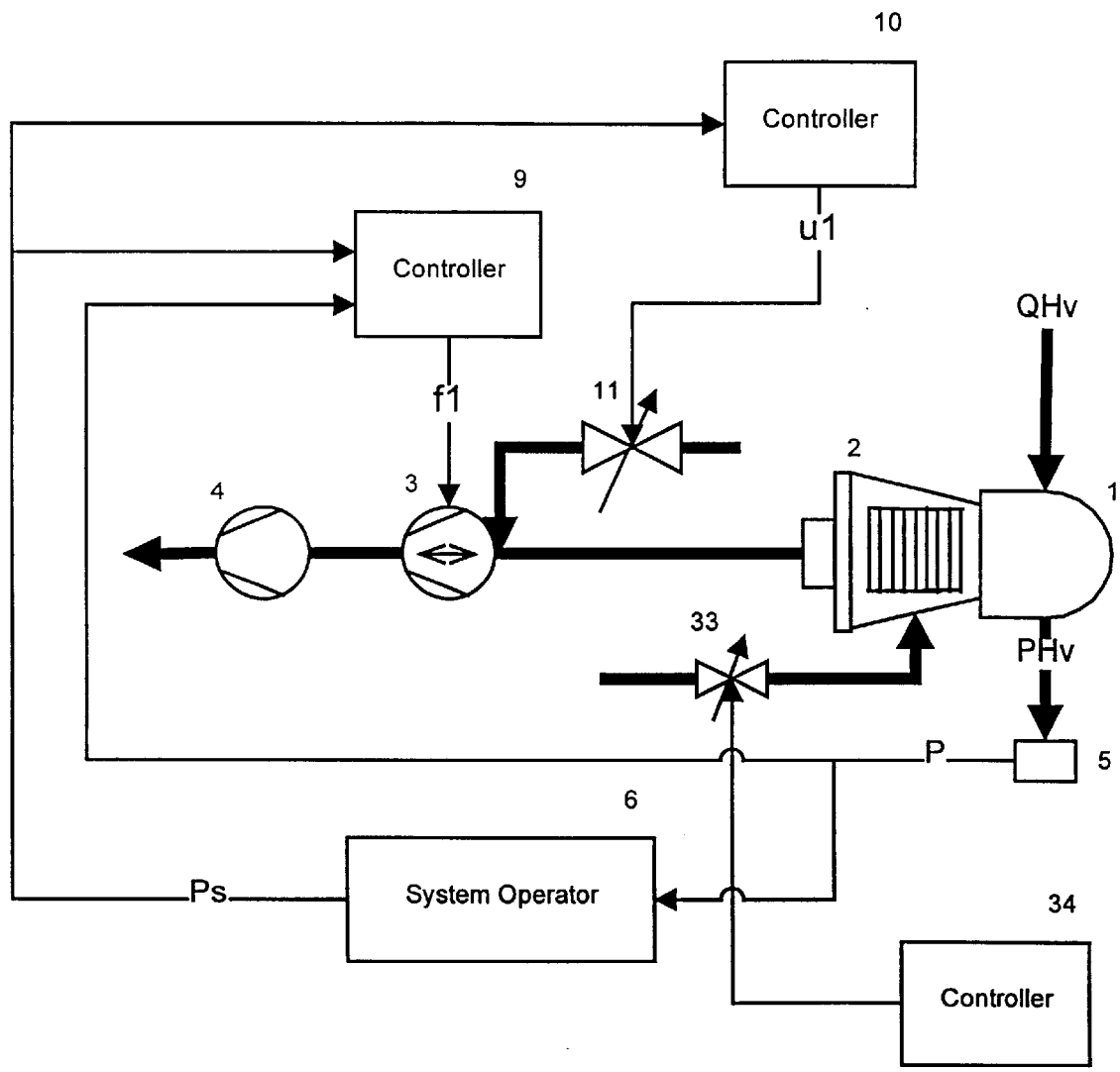

FIG. 8 is a function block diagram illustrating a fourth embodiment of the invention.

Figure 9:
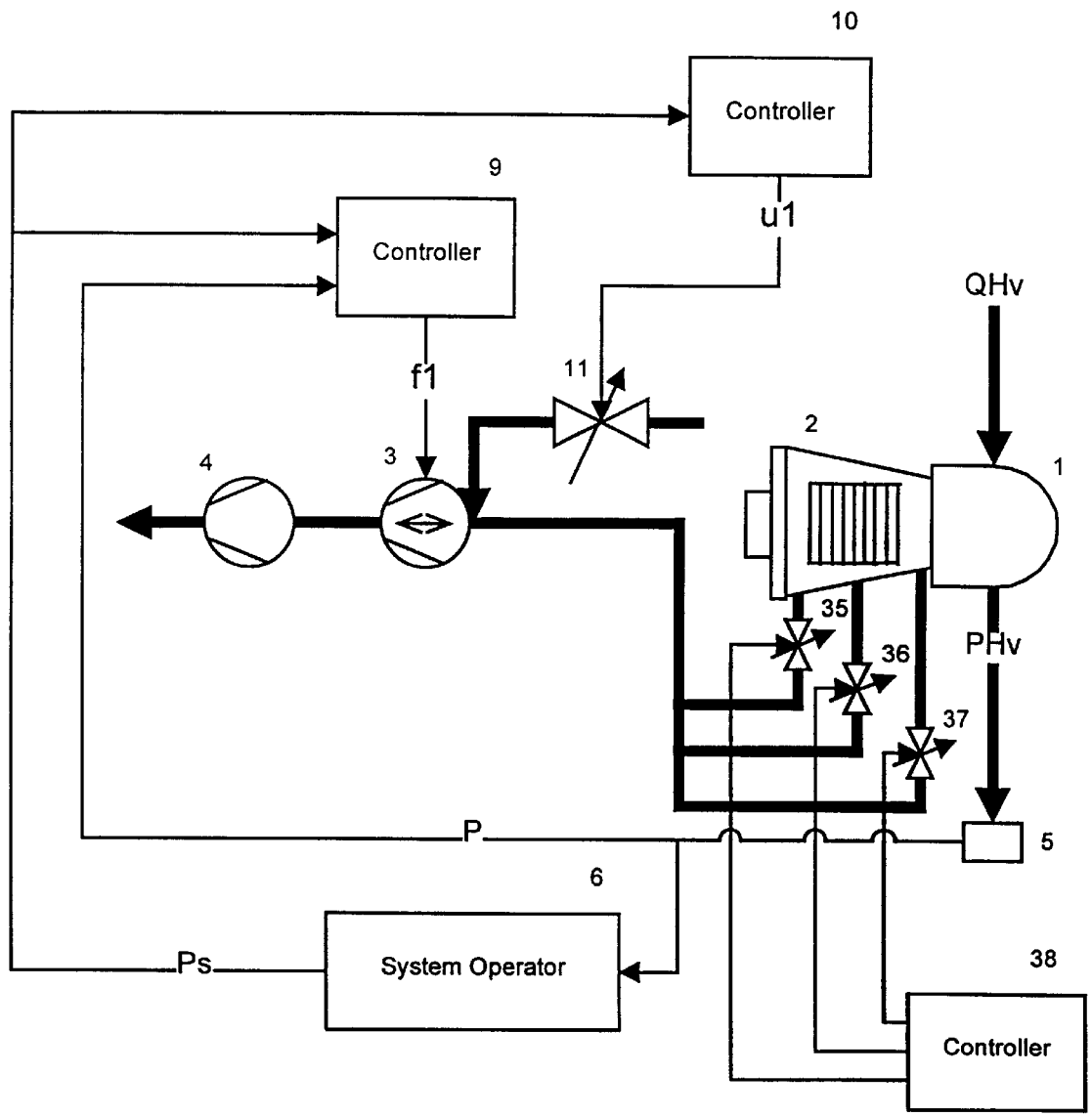

FIG. 9 is a function block diagram illustrating a fifth embodiment of the invention.

Figure 10:
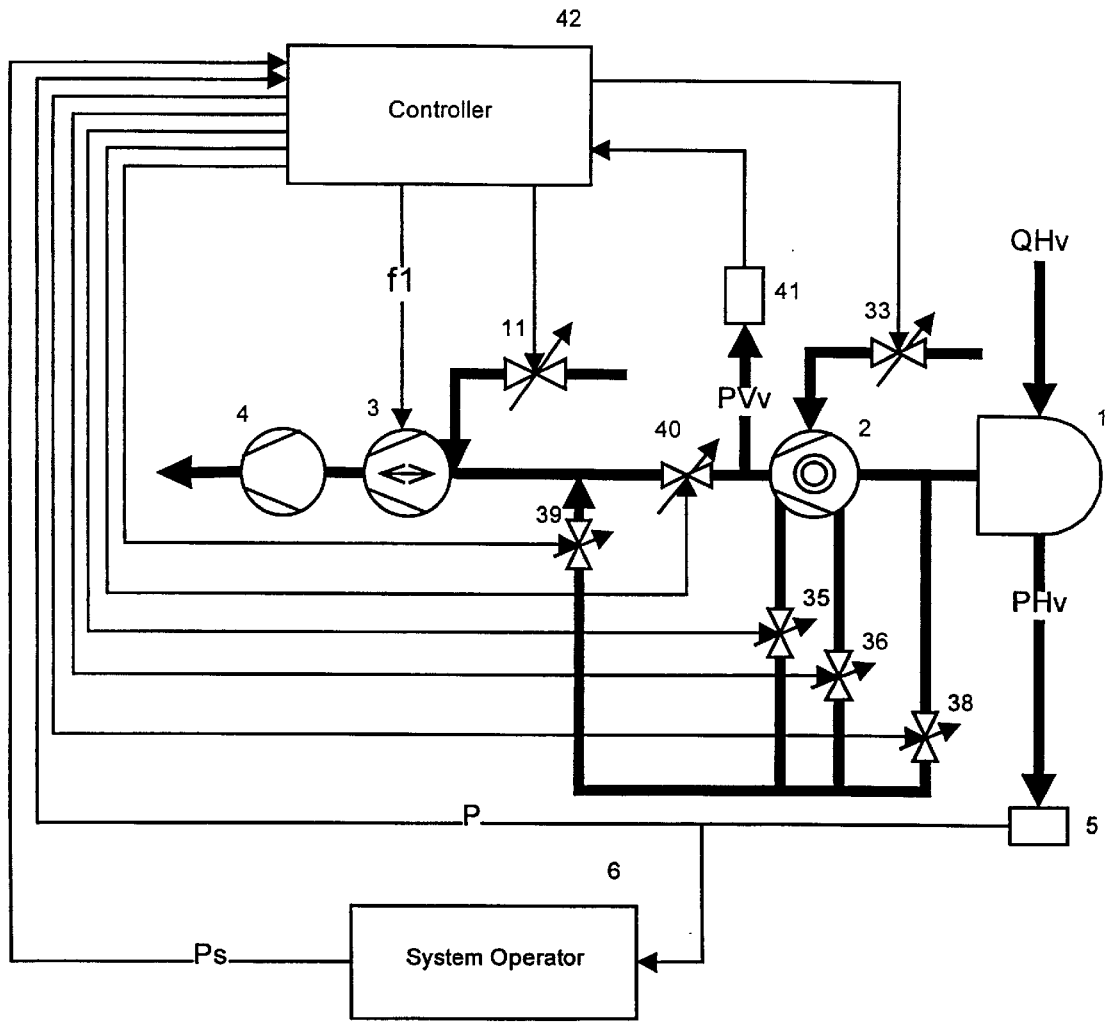

FIG. 10 is a function block diagram illustrating a sixth embodiment of the invention.

Figure 11:
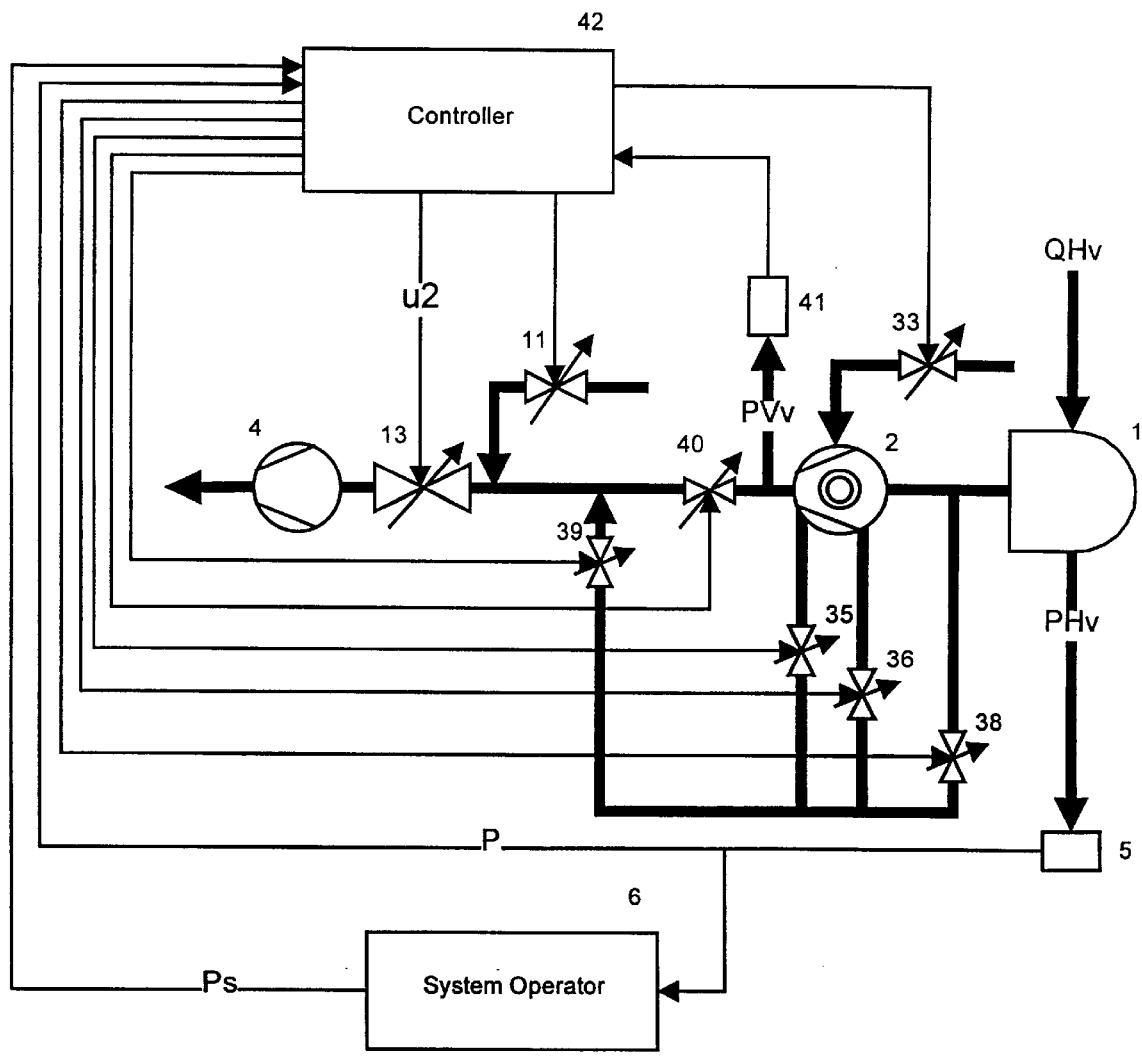

FIG. 11 is a function block diagram illustrating a seventh embodiment of the invention.

Figure 12:
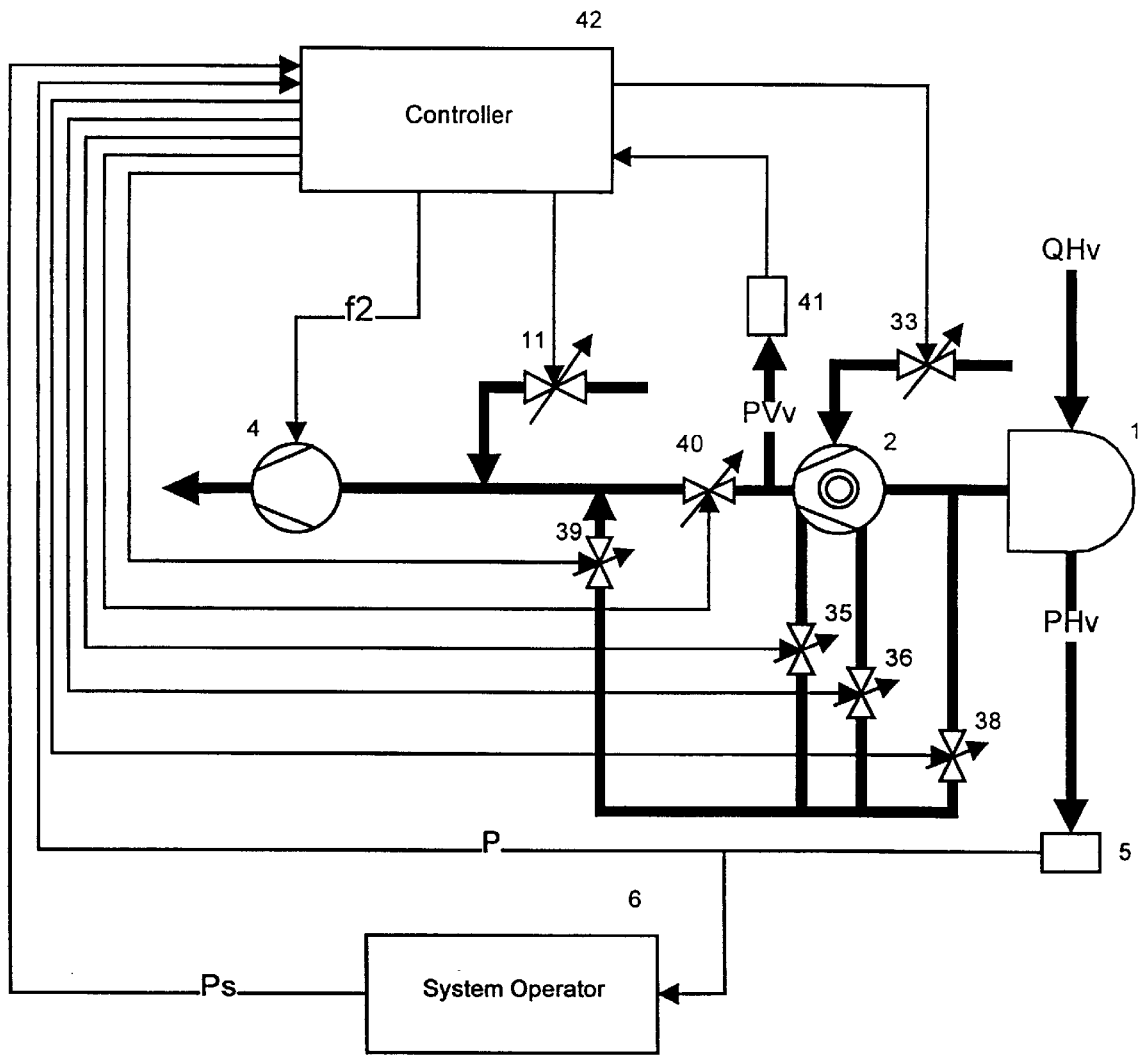

FIG. 12 is a function block diagram illustrating a eighth embodiment of the invention.

Figure 13:
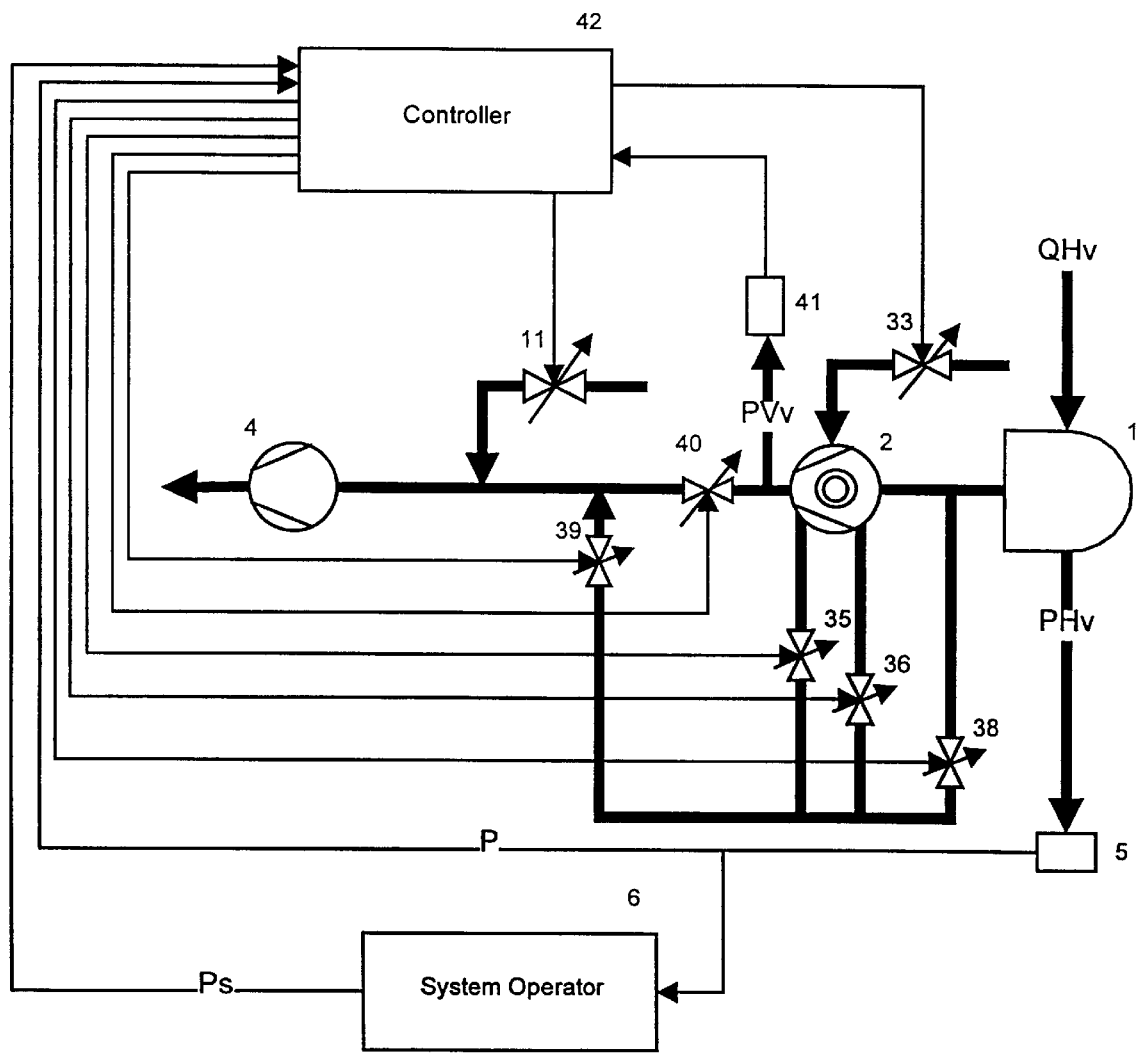

FIG. 13 is a function block diagram illustrating a ninth embodiment of the invention.

Figure 14:
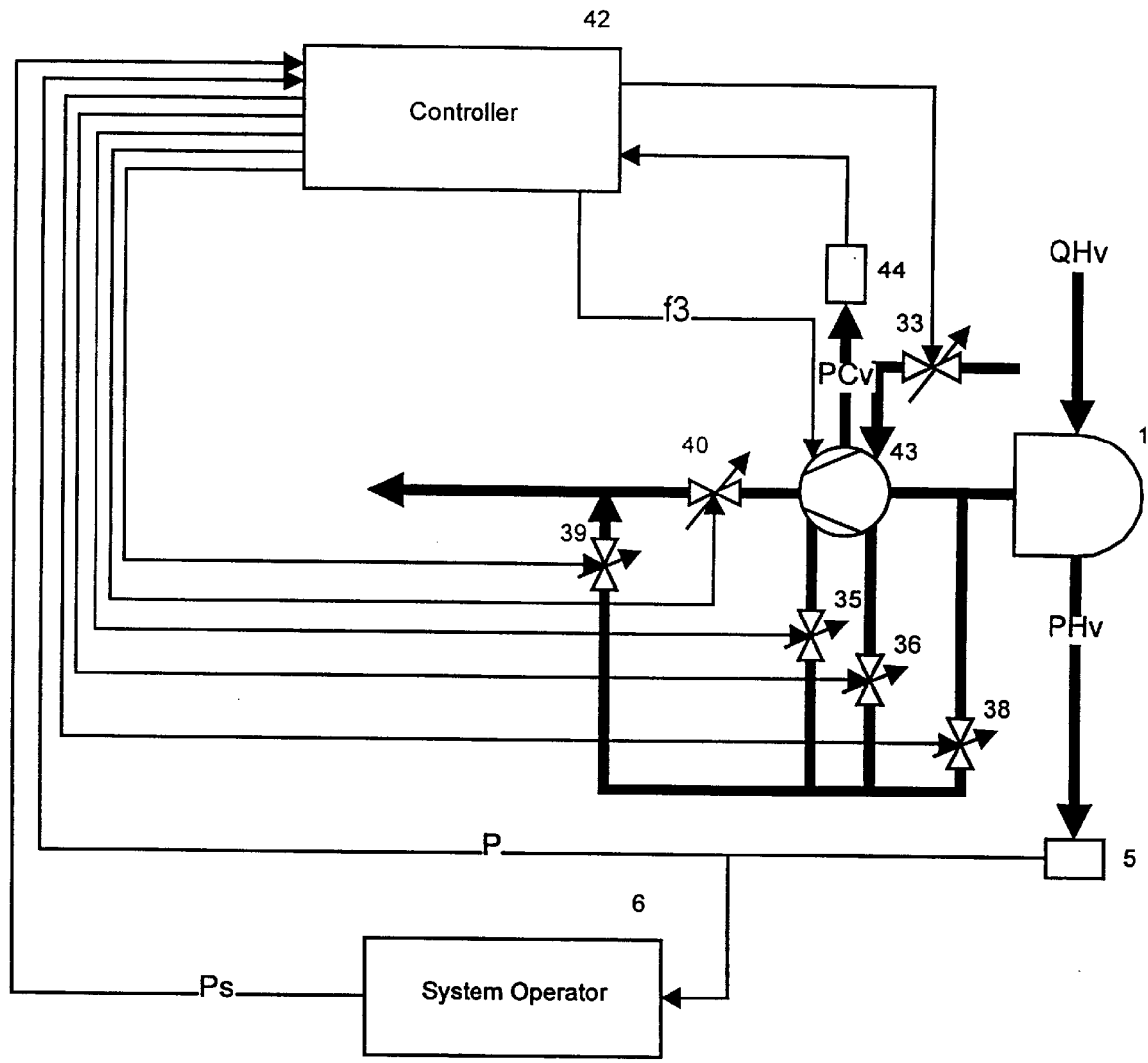

FIG. 14 is a function block diagram illustrating a tenth embodiment of the invention.

DETAILED DESCRIPTION OF THE PREFERRED EMBODIMENTS

Referring now to the accompanying drawings, wherein similar referenced characters refer to similar referenced parts throughout the drawings, FIGS. 2–14 depict an apparatus and a method of a first through tenth embodiments of the present invention for generating a vacuum in a chamber and regulating the pressure therein.

FIRST EMBODIMENT

Figure 1:
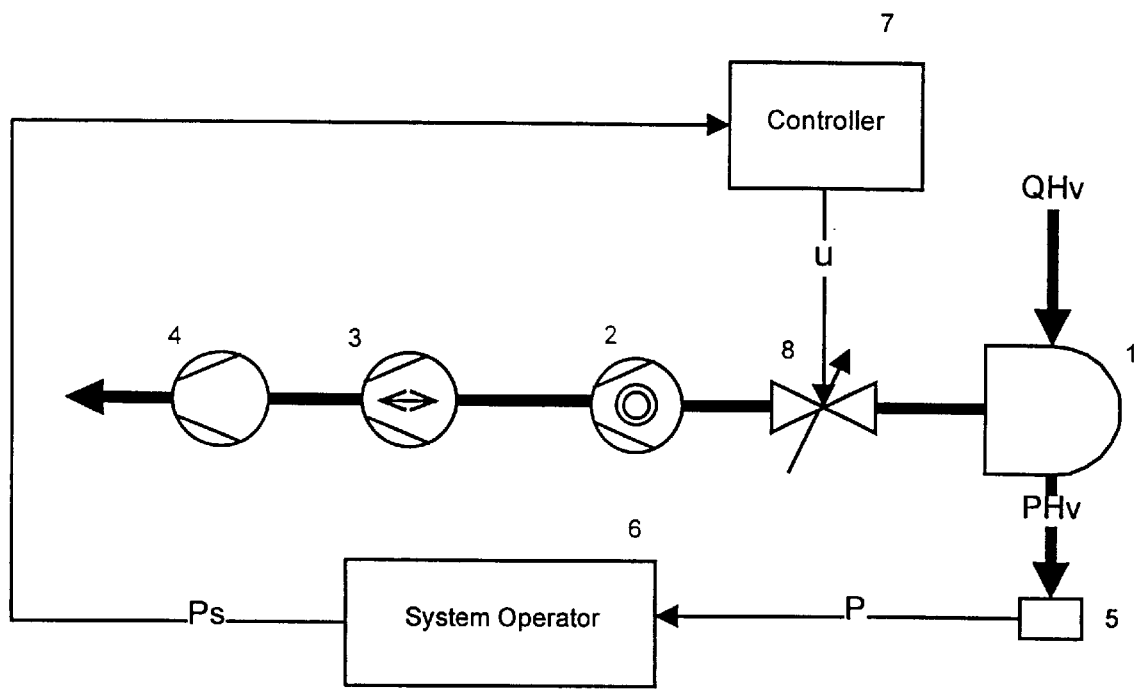
FIG. 1 is a function block diagram illustrating the prior art system for generating a vacuum in a chamber.
Figure 2:
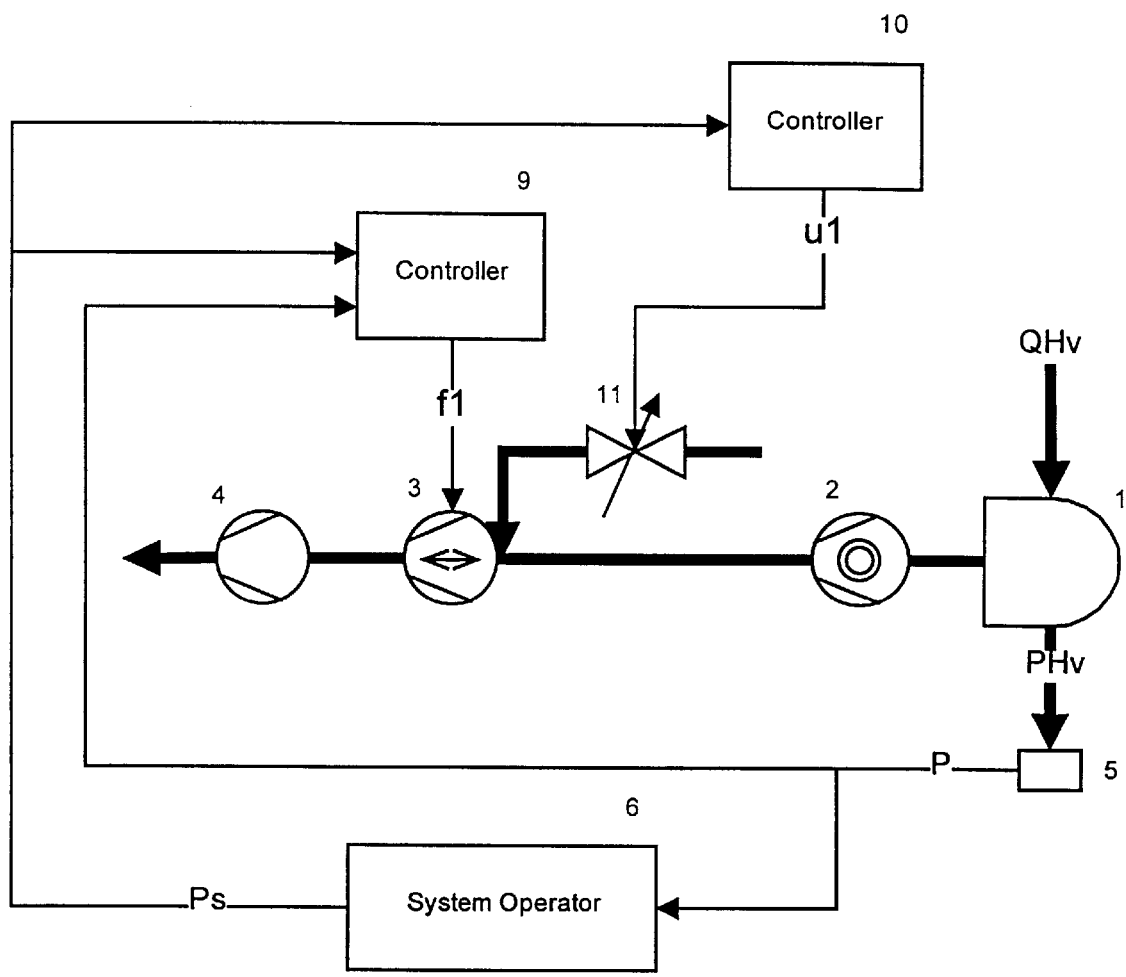
FIG. 2 is a function block diagram illustrating a first embodiment of the invention.
Figure 3:
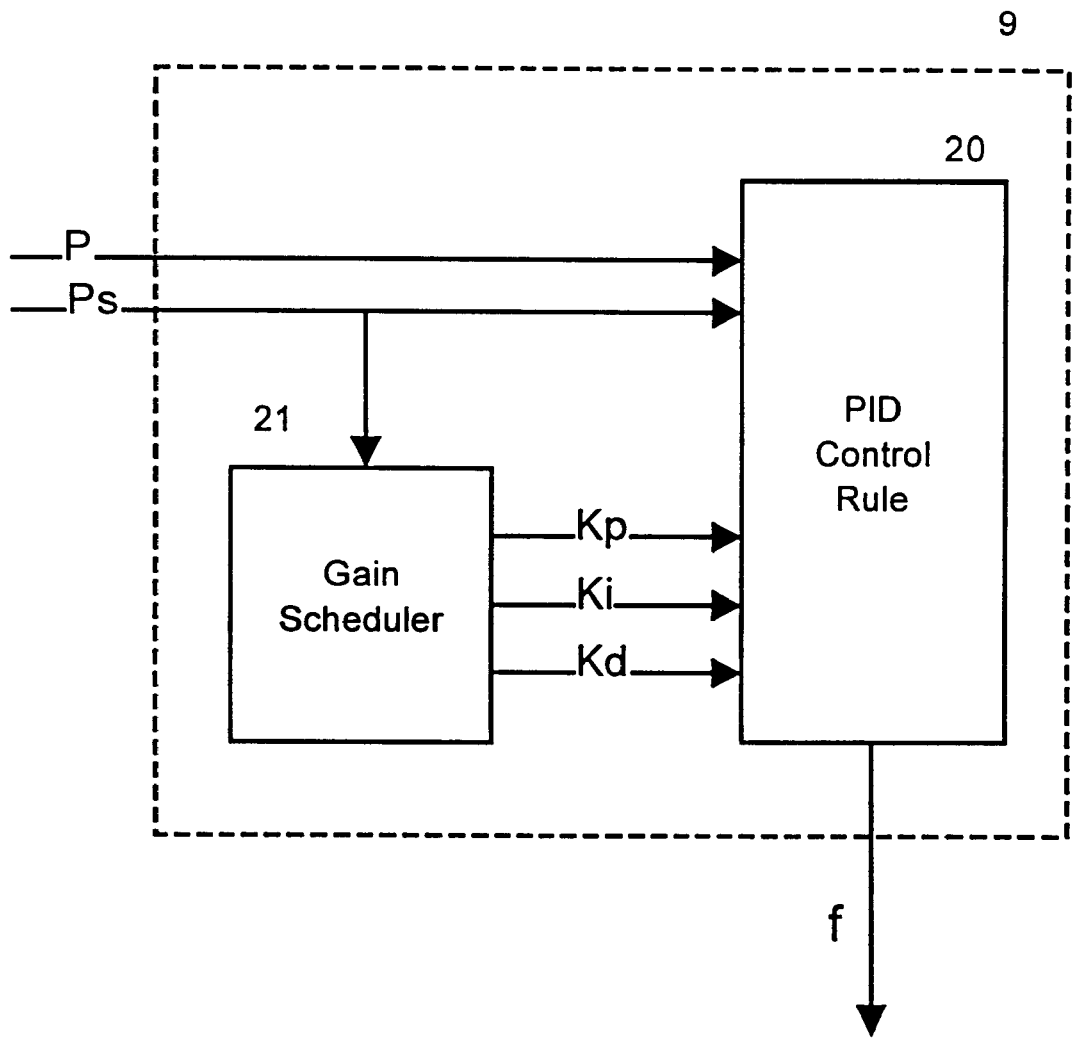
FIG. 3 is a function block diagram illustrating the controller 9 of FIG. 2.

Instead of controlling the pressure PHv in the chamber 1 with a throttle valve 8 as in the prior art system of FIG. 1, the first embodiment of the present invention as shown in FIGS. 2–3 controls the rotational velocity of the roots vacuum pump 3, which thereby changes the exhaust pressure of the high vacuum pump 2 and hence the chamber's pressure PHv.

In the preferred embodiment, the high vacuum pump 2 is a turbo molecular pump, which has several pumping or compressing stages, each of which successively compresses the gases of the chamber 1 from $10^{-6}$ to $10^{-7}$ Torr (intake pressure) to 1.0 to 2.0 Torr (exhaust pressure). Of the turbo molecular pumps available for use as the high vacuum pump 2, the preferable turbo molecular pump is a MAG 2000 turbo molecular pump manufactured by Leybold Vacuum GmbH of Köln, Germany, which is able to compress exhaust pressures of 1.0 to 2.0 Torr to intake pressures of $10^{-6}$ to $10^{-7}$ Torr. Alternatively, any turbo molecular pump can be used that is able to produce low intake pressures suitable for the process in the chamber. As another alternative, any pump can be used that is able to produce low intake pressures suitable for the process in the chamber.

In the preferred embodiment, the roots vacuum pump 3 is the Roots Blower WS 251 PFPE manufactured by Leybold Vacuum GmbH of Köln, Germany, which has a compression ratio in the range of 3 to 5. Alternatively, any pump, such as roots vacuum pump or a rotary pump, can be used that is able to adjust the exhaust pressure of the high vacuum pump 2.

In the preferred embodiment, the pre-vacuum pump 4 is the DRYVAC D100 pump manufactured by Leybold Vacuum GmbH of Köln, Germany, which is capable of compressing exhaust pressures at atmosphere to intake pressures of 0.01 to 1.0 Torr. Alternatively, any pump, such as a roughing pump or a rotary pump, can be used that has a minimum intake pressure approximately greater than the maximum exhaust pressure of the high vacuum pump 2.

In all the preferred embodiments of the invention, the chamber 1 is used for the manufacturing or processing of semiconductor products, such as devices and wafers, using semiconductor manufacturing or processing equipment, such as that used for etch, chemical vapor deposition ("CVD"), physical vapor deposition ("PVD"), thin film technology ("TFT"), and ion implantation. In the preferred embodiment, the pressure in the chamber 1 needs to be regulated around 0.1 to 0.001 Torr for use in the manufacturing or processing of semiconductor products.

Alternatively, the chamber 1 may be that used in any application which requires regulating the pressure in the chamber 1 at a constant pressure.

The system operator 6 determines a desired set point pressure for the chamber 1 based on the pressure signal P from the gauge or sensor 5, which measures the pressure PHv of the chamber 1. The determination of the desired set point pressure can be performed manually or automatically. The system operator 6 generates the set point pressure signal Ps based on the desired set point pressure.

In the preferred embodiment, the pressure signal P and the set point pressure signal Ps are voltage signals between 0 and 10 volts. Alternatively, the pressure signal P and the set point pressure signal Ps can be any other analog signals or digital signals.

The controller 9 uses the pressure signal P and the set point pressure signal Ps to determine a frequency signal f. The frequency signal f1 is used to control the rotational frequency of the roots vacuum pump 3. In the preferred embodiment, the rotational frequency of the roots vacuum pump 3 is varied between 10 and 100 Hz using the frequency signal f1. By changing the rotation frequency of the roots vacuum pump 3, the exhaust pressure of the high vacuum pump 2 is changed. The chamber pressure PHv is also changed. Thus, by regulating the rotational frequency of the roots blower, the pressure in chamber 1 is regulated.

The intake pressure of the high vacuum pump 2 is a function of the flow rate QHv and the compression ratio of the high vacuum pump 2, which is determined by the structural design of the high vacuum pump 2. The effective compression ratio of the high vacuum pump 2 is the ratio of the final pressure-corrected exhaust pressure of the high vacuum pump 2 to the final pressure-corrected intake pressure of the high vacuum pump 2. At a constant flow rate QHv, a typical compression characteristic for the high vacuum pump 2, which is dependent on the design of the high vacuum pump 2, has a maximum at a certain exhaust pressure for the high vacuum pump 2.

At a constant flow rate QHv, the exhaust pressure of the high vacuum pump 2 is dependent on the pumping speed of the pre-vacuum pump 4, the conductance between the intake side of the pre-vacuum pump 4 and the exhaust side of the high vacuum pump 2, and the change in pressure due to varying the rotational frequency of the roots vacuum pump 2. In the preferred embodiment, the minimum exhaust pressure of the high vacuum pump 2 is attained at the maximum pumping speed of the pre-vacuum pump 4.

To generate a low pressure in the chamber 1 at a constant QHv, the intake pressure of the pre-vacuum pump 4 is first decreased, thereby decreasing the exhaust pressure of the high vacuum pump 2 and the chamber's pressure PHv. Initially, the pre-vacuum pump 4 creates a first pressure less than atmosphere both on the exhaust side of the high vacuum pump 2 and in the chamber 1. Alternatively, the high vacuum pump 2 can be bypassed such that the first pressure is created in the chamber 1 but not on the exhaust side of the high vacuum pump 2.

After this first pressure is created by the pre-vacuum pump 4, the high vacuum pump 2 creates a low pressure less than the first pressure in the chamber 1. If the first pressure is created both on the exhaust side of the high vacuum pump 2 and in the chamber 1, the creating of the low pressure in the chamber 1 occurs slowly. Alternatively, if the first pressure is created in the chamber 1 but not on the exhaust side of the high vacuum pump 2, the creating of the low pressure in the chamber 1 occurs rapidly.

In the preferred embodiment, the relationship between the pressures of the exhaust and intake sides of the high vacuum pump 2 is designed to be as continuous and linear as possible to enable use of commercially available controllers.

In the preferred embodiment, the controller 9 selects the frequency signal f1 according to a proportional-integral-derivative ("PID") control rule. As shown in FIG. 3, the controller 9 uses the PID control rule 20, which has as its inputs the pressure signal P and the set point pressure signal Ps and as its output the frequency signal f. The PID control rule 20 is given by the following:

$$f(t) = \qquad (1)$$
$$Kp(P(t) - Ps(t)) + Ki \int^t (P(x) - Ps(x))dx + Kd(d(P(t) - Ps(t))/dt)$$

where Kp is the proportional gain, Ki is the integral gain, Kd is the derivative gain, f, P, and Ps are functions of time t, and x is the variable of integration. The PID control rule 20 can be implemented in either discrete or continuous form, and the controller 9 can be either a digital or an analog controller. Alternatively, other control rules may be used instead of the PID control rule 20.

In the preferred embodiment, the PID gains are selected using a gain scheduler 21. The gain scheduler 21 selects the three PID gains Kp, Ki, and Kd based on the set point pressure signal Ps. In the preferred embodiment, the range of the set point pressure signal Ps is divided into eight regions. As the set point pressure signal Ps varies amongst these eight regions, the gain scheduler 21 supplies the PID control rule 20 with the three PID gains associated with the region where the set point pressure signal Ps lies.

As an example, if the gain scheduler 21 has three regions, the three PID gains are determined as follows:

$$Kp = Kp1, Ki = Ki1, Kd = Kd1 \quad \text{if } Ps < th1 \qquad (2)$$
$$Kp = Kp2, Ki = Ki2, Kd = Kd2 \quad \text{if } th1 \leq Ps < th2$$
$$Kp = Kp3, Ki = Ki3, Kd = Kd3 \quad \text{if } Ps \geq th2$$

where Kp1, Kp2, and Kp3 are the three proportional gains for the three regions, Ki1, Ki2, and Ki3 are the three integral gains for the three regions, Kd1, Kd2, and Kd3 are the three derivative gains for the three regions, and th1 and th2 are the thresholds for separating the three regions of the set point pressure signal Ps. The gain scheduling by the gain scheduler 21 can be implemented in either discrete or continuous form, and the gain scheduler 21 can be either a digital or analog gain scheduler.

With the three PID gains from the gain scheduler 21, the pressure signal P, and the set point pressure signal Ps, the PID control rule 20 determines the frequency signal f according to equation (1).

In the preferred embodiment, the derivative gain Kd is set to zero (0) for the entire range of the set point pressure signal Ps. In other words, in the preferred embodiment, the PID control rule reduces to a proportional-integral ("PI") control rule. Alteratively, any combination of the three PID gains can be set to zero (0) as long as at least one is non-zero.

As an alternative to using the gain scheduler 21, a single set of PID gains can be used for the entire range of the set point pressure signal Ps. As another alternative, any signal relevant to the control of the system can be used as the input to the gain scheduler 21 to select the gains for the control rule. As a further alternative, any combination of signals relevant to the control of the system can be used as the input to the gain scheduler 21 to select the gains for the control rule.

To ease the transition between the PID gains selected by the gain scheduler 21, interpolation between the immediately selected set of PID gains and the previously selected set of PID gains can be used. For example, a linear interpolation between these two sets can be employed.

In addition to or instead of controlling the rotational frequency of the roots vacuum pump 3, the exhaust pressure of the high vacuum pump 2 can be changed using the controller 10 and the control valve 11. By injecting gas into the conduit between the roots vacuum pump 3 and the high vacuum pump 2, the exhaust pressure of the high vacuum pump 2 can be changed. By increasing or decreasing the injection of gas into the conduit between the roots vacuum pump 3 and the high vacuum pump 2, the exhaust pressure of the high vacuum pump 2 can be increased or decreased, respectively. In this way, the exhaust pressure of the high vacuum pump 2 is regulated, and hence the pressure of the chamber 1 is regulated.

To regulate the exhaust pressure of the high vacuum pump 2, the control valve 11 controls the amount of gas injected into the conduit, and the controller 10 determines the extent to which the control valve 11 is opened or closed.

In the preferred embodiment, the controller 10 controls the extent to which the control valve 11 is opened or closed according to the following:

$$u1 = 1 \qquad \text{if } Ps < th3 \qquad (3)$$
$$u1 = K1(Ps + K2) \quad \text{if } th3 \leq Ps < th4$$
$$u1 = 0 \qquad \text{if } Ps \geq th4$$

where u1=1 indicates that the control valve 11 is fully open, u1=0 indicates the control valve 11 is fully closed, u1 between 0 and 1 indicates that the control valve 11 is partially closed or partially open, K1 and K2 are variables selected such that u1 is between 0 and 1, and th3 and th4 are thresholds for separating regions of the set point pressure signal Ps.

Alternatively, the control valve can be either fully opened or fully closed according to the following control rule:

$$u1 = 1 \quad \text{if } Ps < th3 \qquad (4)$$
$$u1 = 0 \quad \text{if } Ps \geq th3$$

Alternatively, a PID control rule, as described above, with or without a gain scheduler, as described above, may be used as the control rule for controlling the control valve 11.

EXAMPLE OF THE FIRST EMBODIMENT

In FIG. 4, the characteristic curve for the high vacuum pump 2 of the prior art system as shown in FIG. 1 is compared with the characteristic curve for the high vacuum pump 2 of the first embodiment of the invention as shown in FIG. 2. In FIG. 4, the abscissa is the exhaust pressure for the high vacuum pump 2, and the ordinate is the intake pressure for the high vacuum pump 2. For comparison, the same high vacuum pump is used, namely the MAG 2000 turbo molecular pump manufactured by Leybold Vacuum GmbH of Köln, Germany. The difference between the two is that to regulate the pressure in the chamber 1, the prior art system uses the throttle valve, and the first embodiment uses the rotational frequency controlled roots vacuum pump.

As can be seen in FIG. 4, the first embodiment, indicated by the line with open triangles, is able to achieve a higher intake pressure for a lower exhaust pressure than the prior art system, indicated by the line with solid squares. Further, the first embodiment achieves a smoother transition between the horizontal and near vertical portions of the characteristic curve than the prior art system. This smoother transition allows for better control of the system by the controller 9.

SECOND EMBODIMENT

In the second embodiment of the present invention, as shown in FIGS. 5 and 6, the roots vacuum pump 3 and the control valve 11 of the first embodiment are replaced by a control valve 13. The controller 12 uses the pressure signal P from the sensor 5 and the set point pressure signal Ps from the system operator 6 to determine a control signal u2, which is used to regulate the opening and closing of the control valve 13.

In the preferred embodiment, the control valve 13 should be situated as closely as possible to the high vacuum pump 2 in order to minimize the relevant volume of the conduit between the control valve 13 and the high vacuum pump 2.

In the preferred embodiment, the control valve 13 is opened and closed using a fine resolution stepping motor. Further, for use with semiconductor manufacturing or processing within the chamber 1, the control valve 13 should be tolerable of wide temperature variations.

As shown in FIG. 6, controller 12 uses a PID control rule 22 and a gain scheduler 23, both of which are similar to the PID control rule 20 and gain scheduler 21, respectively, of controller 9. To determine the control signal u2, the PID control rule 22 uses the following:

$$u2(t) = Kp(Ps(t) - P(t)) + Ki \int^t (P(x) - Ps(x))dx + Kd(d(P(t) - Ps(t))/dt) \quad (5)$$

where Kp is the proportional gain, Ki is the integral gain, Kd is the derivative gain, u2, P, and Ps are functions of time t, and x is the variable of integration. The PID control rule 22 can be implemented in either discrete or continuous form, and the controller 12 can be either a digital or an analog controller. Alternatively, other control rules besides the PID control rule can be used by the controller 12.

In the preferred embodiment, the gain scheduler 23, like the gain scheduler 21, selects the three PID gains for the PID control rule 22 based on the set point pressure signal Ps. Alternatively, any signal relevant to the control of the system can be used as the input to the gain scheduler 23.

THIRD EMBODIMENT

In the third, fourth, and fifth embodiments, the high vacuum pump 2 of the first embodiment is a modified turbo molecular pump. These three embodiments are respectively illustrated with function block diagrams in FIGS. 7, 8, and 9. For each of the three embodiments, the goal is to decrease the compression ratio for the high vacuum pump 2. For ease of explanation, the graphical symbol for the high vacuum pump 2 in FIGS. 2 and 5 is replaced by a more detailed one for the embodiment of a turbo molecular pump in FIGS. 7–9.

In some applications, such as in the manufacturing or processing of semiconductor products, such as devices or wafers, various gases are injected into the chamber 1 and have various pressure compressions. For those gases having a higher pressure compression, for example $BCl_3$ or $SF_0$, the high vacuum pump will have a larger power consumption than for those gases having a lower pressure compression, for example $H_2$. To avoid this higher power consumption by the high vacuum pump 2, the compression ratio of the high vacuum pump 2 can be adjusted, and three such ways are described next as the third, fourth, and fifth embodiments.

In the third embodiment as illustrated in FIG. 7, the high vacuum pump 2 is a turbo molecular pump modified by including a bypass from one of the intermediate compression stages in the turbo molecular pump 2 to the exhaust side of the turbo molecular pump 2. Control valve 31 controls the flow between the bypassed intermediate compression stage and the exhaust side of the turbo molecular pump 2. In this manner, the compression ratio of the turbo molecular pump 2 can be altered.

In the preferred embodiment, control valve 31 is either fully opened or fully closed. Alternatively, the control valve 31 can be partially opened or partially closed.

As an example, with the control valve 31 fully closed, an exhaust pressure of 5 Torr is required to achieve an intake pressure of 20 mTorr for the turbo molecular pump 2. However, with the control valve 31 fully open, an exhaust pressure of 2 Torr is required to achieve an intake pressure of 20 mTorr for the turbo molecular pump 2.

The extent to which the control valve 31 is opened or closed is controlled by the control rule of controller 32. Controller 32 adjusts the control valve 31 according to a control rule based on, for example, the pressure signal P, the set point pressure signal Ps, or any other signal relevant to controlling the system. The control rule used here may be similar to that used by controller 10 to adjust the control valve 11 as in the first embodiment. Alternatively, the control rule may be a PID control rule, as discussed above for the first embodiment, and may include a gain scheduler, as discussed above for the first embodiment. As an alternative, the control rule may be any control rule useful for controlling the control valve 31.

FOURTH EMBODIMENT

In the fourth embodiment as shown in FIG. 8, the high vacuum pump 2 of the first embodiment is a turbo molecular pump modified by including an injection of gas into one of the intermediate compression stages of the turbo molecular pump 2. The injection of the gas is controlled by the control valve 33, which is controlled by controller 34. As such, the compression ratio of the turbo molecular pump 2 can be increased.

In the preferred embodiment, the control valve 33 is fully opened or fully closed. Alternatively, the control valve 33 can be partially opened or partially closed.

The extent to which the control valve 33 is opened or closed is controlled by the control rule of controller 34. Controller 34 adjusts the control valve 33 according to a control rule based on, for example, the pressure signal P, the set point pressure signal Ps, or any other signal relevant to controlling the system. The control rule used here may be similar to that used by controller 10 to adjust the control valve 11 as in the first embodiment. Alternatively, the control rule may be a PID control rule, as discussed above for the first embodiment, and may include a gain scheduler, as discussed above for the first embodiment. As an alternative, the control rule may be any control rule useful for controlling the control valve 33.

FIFTH EMBODIMENT

In the fifth embodiment as shown in FIG. 9, the high vacuum pump 2 of the first embodiment is replaced with a turbo molecular pump modified to include several valves for bypassing intermediate compression stages of the turbo molecular pump, and so doing without recirculation. The control valves 35, 36, and 37 are used to disable the compression stages of the turbo molecular pump. A controller 38 is used to adjust the control valves 35, 36, and 37. As is shown in FIG. 9, three control valves are used. Alternatively, any number of control valves up to the number of compression stages of the turbo molecular pump can be used. As such, the compression ratio of the turbo molecular pump 2 can be varied.

In FIG. 9, the exhaust side of the high vacuum pump 2 is shown not coupled to the exhaust sides of control valves 35, 36, and 37. Alternatively, an additional control valve can be added having an intake side coupled to the exhaust side of the high vacuum pump 2 and an exhaust side coupled to the exhaust sides of control valves 35, 36, and 37 and to the intake side of the roots vacuum pump 3. This additional control valve can be controlled by controller 38 such that gases from the exhaust side of the high vacuum pump 2 are not coupled with gases from the exhaust sides of control valves 35, 36, and 37.

In the preferred embodiment, the control valves 35, 36, and 37 are either fully opened or fully closed. Alternatively, control valves 35, 36, and 37 can be partially opened or partially closed.

The extent to which the control valves 35, 36, and 37 are opened or closed is controlled by the control rule of controller 38. Controller 38 adjusts the control valves 35, 36, and 37 according to a control rule based on, for example, the pressure signal P, the set point pressure signal Ps, or any other signal relevant to controlling the system. The control rule used here may be similar to that used by controller 10 to adjust the control valve 11 as in the first embodiment. Alternatively, the control rule may be a PID control rule, as discussed above for the first embodiment, and may include a gain scheduler, as discussed above for the first embodiment. As an alternative, the control rule may be any control rule useful for controlling the control valves 35, 36, and 37.

As an example, if the turbo molecular pump has 20 compression stages, the three control valves 35, 36, and 37 could be coupled to the fifteenth, tenth, and fifth compression stages, respectively. If the control valve 35 is opened and the control valves 36 and 37 are closed, compression stages 16 through 20 are bypassed. Moreover, if control valves 35 and 36 are open and control valve 37 is closed, compression stages 11 through 20 are bypassed. In this manner, the compression ratio of the turbo molecular pump 2 is decreased.

SIXTH EMBODIMENT

In the sixth embodiment as shown in FIG. 10, the first, third, fourth, and fifth embodiments are combined. Instead of using multiple controllers, a single controller 42 is used to control all the control valves and pumps. The controller 42 can implement the control rules, as discussed above. Alternatively, the control 42 can implement a multi-variable control rule. As another alternative, any control rule or control rules useful for controlling the system can be used.

In addition to the bypass control valves in the third, fourth, and fifth embodiments, additional control valves are in the sixth embodiment. The control valve 38 is used to bypass the high vacuum pump 2. The control valve 39 functions as the control valve 31 in FIG. 7 and as discussed in the third embodiment. The control valve 40 is used to implement the bypass of the exhaust of the high vacuum pump 2 as in FIG. 9 and as discussed above in the fifth embodiment. The combination of control valves 38, 39, and 40 can be used to bypass the high vacuum pump 2 completely. As discussed above in the fifth embodiment, the control valves 35 and 36 are used to bypass the compression stages in the high vacuum pump 2. Alternatively, one or more compression stages can be bypassed using a single control valve with each side of the control valve coupled to a different compression stage.

The control valves 35, 36, 38, 39, and 40 are controlled as described above for the control valves 31, 33, 35, 36, and 37. In practicing the invention, the control valves can be used in any combination to regulate the pressure in the chamber 1. Alternatively, additional control valves can be added to bypass the high vacuum pump 2 or any of its compression stages.

The gauge or sensor 41 measures the pressure PVv at the exhaust of the high vacuum pump 2. Gauge or sensor 41 can produce an analog or digital signal. The signal from gauge or sensor 41 can be used to control the system according to a control rule or control rules in controller 42.

In the preferred embodiment, to regulate the pressure in the chamber 1, the roots vacuum pump 3 is primarily used. Alternatively, any combination of the control valves can be used in addition to or instead of the roots vacuum pump 3 to regulate the pressure in the chamber 1.

SEVENTH EMBODIMENT

In the seventh embodiment as shown in FIG. 11, the roots vacuum pump 3 of the sixth embodiment is replaced by the control valve 13 of the second embodiment. As in the second embodiment, the control valve 13 regulates the exhaust pressure PVv of the high vacuum pump 2 and in turn regulates the pressure PHv of the chamber 1.

In the preferred embodiment, to regulate the pressure in the chamber 1, the control valve 13 is primarily used. Alternatively, any combination of the control valves or additional control valves can be used in addition to or instead of the control valve 13 to regulate the pressure in the chamber 1.

EIGHTH EMBODIMENT

In the eighth embodiment as shown in FIG. 12, the roots vacuum pump 3 of the sixth embodiment is eliminated. In place of regulating the pressure in the chamber 1 by controlling the rotational frequency of the roots vacuum pump 3, the rotational frequency of the pre-vacuum pump 4 is controlled with the frequency signal f2. The controller 42 generates the frequency signal f2 as described above for the generation of the frequency signal f1 by the controller 9. Similar to the embodiments described above, by varying the rotational frequency of the pre-vacuum pump 4, the exhaust pressure PVv of the high vacuum pump 2 is regulated and, hence, the pressure PHv of the chamber 1 is regulated.

In the preferred embodiment, to regulate the pressure in the chamber 1, the pre-vacuum pump 4 is primarily used. Alternatively, any combination of the control valves or additional control valves can be used in addition to or instead of the pre-vacuum pump 4 to regulate the pressure in the chamber 1.

NINTH EMBODIMENT

In the ninth embodiment as shown in FIG. 13, the roots, vacuum pump 3 of the sixth embodiment is eliminated. In place of regulating the pressure in the chamber 1 by controlling the rotational frequency of the roots vacuum pump 3, the pressure in the chamber 1 is regulated by increasing or decreasing the injection of gas via control valve 11, as described above in the first embodiment.

Alternatively, instead of using the control valve 11, the pressure in the chamber 1 can be regulated by increasing or decreasing the injection of gas via control valve 33, as described above in the fourth embodiment.

As another alternative, the combination of using control valves 11 and 33 can be used to regulate the pressure in the chamber 1.

In the preferred embodiment, to regulate the pressure in the chamber 1, a combination of the control valves 1 and 33 is primarily used. Alternatively, any combination of the remaining control valves or additional control valves can be used in addition to or instead of the control valves 1 and 33 to regulate the pressure in the chamber 1.

TENTH EMBODIMENT

In the tenth embodiment as shown in FIG. 14, the roots vacuum pump 3 and the pre-vacuum pump 4 of the sixth embodiment are eliminated, and the high vacuum pump 2 is replaced by a high compression pump 43. The high compression pump 43 compresses gases with an intake pressure of a low value required by the use of the chamber 1 to an exhaust pressure of atmosphere. The high compression pump 43 has several pumping or compressing stages, which successively compress the gases from the chamber 1 to atmospheric pressure. All of the pumping or compressing stages of the high compression pump 43 are disposed within one housing.

In the preferred embodiment, the high compression pump 43 compresses intake pressures of $10^{-1}$ to $10^{-5}$ Torr to exhaust pressures at atmospheric pressure. Alternatively, the high compression pump 43 compresses low intake pressures suitable for the process in the chamber 1 to atmospheric exhaust pressure.

The pressure in the chamber 1 is regulated by controlling the rotational frequency of the high compression pump 43 with the frequency signal f3. In the preferred embodiment, the controller 42 generates the frequency signal f3 as described above for the generation of the frequency signal f1 by the controller 9. In particular, the control rule for the controller 42 is a PID control rule, as discussed above for the first embodiment, and may include a gain scheduler, as discussed above for the first embodiment. Alternatively, the control rule may be any control rule useful for controlling the high compression pump 43. Similar to the embodiments described above, by varying the rotational frequency of the high compression pump 43, the pressure PHv of the chamber 1 is regulated.

The gauge or sensor 44 measures the pressure PCv internal to the high compression pump 43. Gauge or sensor 44 can produce an analog or digital signal. The signal from gauge or sensor 44 can be used to control the system according to a control rule or control rules in controller 42. Alternatively, additional internal or exhaust pressures of the high compression pump 43 can be measured by additional gauges or sensors 44.

In addition to or instead of regulating the pressure in the chamber 1 by controlling the rotational frequency of the high compression pump 43, any combination of the following can be used: control valves 35, 36, 36, 39, and 40; any additional control valves for bypassing the compression stages of the high compression pump 43; the control valve 33; and any additional control valves for injecting gas into the compression stages of the high compression pump 43. Non-limiting examples of controlling the pressure in the chamber with control valves include any combination of the following: a control valve coupled between a compression stage and the exhaust side of the high compression pump 43; a control valve coupled between a compression stage and another compression stage of the high compression pump 43; a control valve coupled between a compression stage and the intake side of the high compression pump 43; a control valve coupled between the intake side and the exhaust side of the high compression pump 43; a control valve coupled between a compression stage and a gas supply and for injecting gas into the compression stage of the high compression pump 43; and a control valve coupled between the exhaust side of high compression pump 43 and a gas supply and for injecting gas into the exhaust side of the high compression pump 43.

To control any of the above combinations of control valves, one or more controllers can be used with one or more control rules and with any signal relevant to the control of the system. Non-limiting examples of a control rule or control rules include any combination of the following: a threshold control rule, as described above for the first embodiment; a PID control rule, as described above for the first embodiment, and which may include a gain scheduler, as discussed above for the first embodiment; and a multi-variable control rule. Non-limiting examples of any signal relevant to the control of the system include any combination of the following: the pressure signal P; the set point pressure signal Ps; and a pressure signal corresponding to an internal or exhaust pressure of the high compression pump 43 as measured by the gauge or sensor 44.

In the several embodiments of the invention, several separate controllers are used to control various control valves and pumps in the system. Alternatively, a single controller can be used to control all the control valves and pumps in the system using a multi-variable control rule. In practicing the invention of the several embodiments, several controllers, a single controller, or any combination thereof can be used to control all the control valves and pumps in the system using a single control rule or multiple control rules. In practicing the invention, the controller or controllers can be either digital or analog and can implement a control rule or control rules in either discrete or continuous form.

As the invention has been described in detail with respect to the preferred embodiments, it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. An apparatus for regulating a pressure in a chamber comprising:

a first vacuum pump having a compression stage, an exhaust side, and an intake side communicating directly with the chamber for generating a first pressure in the chamber;

a controllable pressure regulator coupled to the first vacuum pump and having a control input for receiving a first signal for regulating an exhaust pressure at the exhaust side of the first vacuum pump or an internal pressure at the compression stage of the first vacuum pump, and to thereby regulate the pressure in the chamber; and a controller having an input for receiving a second signal representing a control pressure in the apparatus, and an output connected to the control input of the controllable pressure regulator, the controller producing at the output the first signal as a function of the second signal.

2. An apparatus according to claim 1, wherein the controllable pressure regulator comprises:

a second vacuum pump having an intake side coupled to the exhaust side of the first vacuum pump and generating a second pressure, higher than the first pressure, at the intake side of the second vacuum pump.

3. An apparatus according to claim 2, wherein the controllable pressure regulator further comprises:

a roots vacuum pump for coupling the first and second vacuum pumps and having a variable rotational frequency, an intake side coupled to the exhaust side of the first vacuum pump, and an exhaust side coupled to the intake side of the second vacuum pump, and wherein the first signal produced by the controller controls the variable rotational frequency of the roots vacuum pump and thereby regulates the exhaust pressure of the first vacuum pump.

4. An apparatus according to claim 2, wherein the controllable pressure regulator further comprises:

a controllable valve for coupling the first and second vacuum pumps and having an intake side coupled to the exhaust side of the first vacuum pump and an exhaust side coupled the intake side of the second vacuum pump.

5. An apparatus according to claim 4, wherein the first signal from the controller controls opening and closing of the controllable valve and thereby regulates the exhaust pressure of the first vacuum pump.

6. An apparatus according to claim 4, wherein the controllable pressure regulator further comprises:

a stepping motor for opening and closing the controllable valve, and wherein the first signal from the controller controls stepping of the stepping motor and thereby regulates the exhaust pressure of the first vacuum pump.

7. An apparatus according to claim 2, wherein the second vacuum pump has a variable rotational frequency, and wherein the first signal produced by the controller controls the variable rotational frequency of the second vacuum pump and thereby regulates the exhaust pressure of the first vacuum pump.

8. An apparatus according to claim 1, wherein the first pressure generated by the first vacuum pump is less than atmospheric pressure;

wherein the exhaust pressure of the first vacuum pump is at atmospheric pressure;

wherein the first vacuum pump has a variable rotational frequency and a control input for receiving the first signal for varying the rotational frequency of the first vacuum pump;

wherein the controller produces the first signal for varying the variable rotational frequency of the first vacuum pump; and wherein the controllable pressure regulator passes the first signal from its control input to the control input of the first vacuum pump.

9. The apparatus according to claim 1, wherein the controllable pressure regulator comprises a controllable valve having an intake side coupled to a gas supply and an exhaust side coupled to the exhaust side of the first vacuum pump.

10. The apparatus according to claim 9, wherein the controllable pressure regulator further comprises a vacuum pump having a variable rotational frequency, an exhaust side, and an intake side coupled to the exhaust sides of the first vacuum pump and the controllable valve.

11. The apparatus according to claim 1, wherein the controllable pressure regulator comprises a controllable valve having an intake side coupled to a gas supply and an exhaust side coupled to the compression stage of the first vacuum pump.

12. The apparatus according to claim 1, wherein the controllable pressure regulator comprises a controllable valve having an intake side coupled to the compression stage of the first vacuum pump and an exhaust side coupled to the exhaust side of the first vacuum pump.

13. The apparatus according to claim 1, wherein the first vacuum pump has a second compression stage, and wherein the controllable pressure regulator comprises a controllable valve having an intake side coupled to the compression stage of the first vacuum pump and an exhaust side coupled to the second compression stage of the first vacuum pump.

14. The apparatus according to claim 1, wherein the controllable pressure regulator comprises a controllable valve having an intake side coupled to the compression stage of the first vacuum pump and an exhaust side coupled to the intake side of the first vacuum pump.

15. The apparatus according to claim 1, wherein the controllable pressure regulator comprises a controllable valve having an intake side coupled to the intake side of the first vacuum pump and an exhaust side coupled to the exhaust side of the first vacuum pump.

16. The apparatus according to claim 1, wherein the controllable pressure regulator comprises:

a second vacuum pump having an intake side coupled to the exhaust side of the first vacuum pump;

a first controllable valve having an intake side coupled to the compression stage of the first vacuum pump and an exhaust side; and a second controllable valve for coupling the first and second vacuum pumps and having an intake side coupled to the exhaust side of the first vacuum pump and an exhaust side coupled to the intake side of the second vacuum pump and the exhaust side of the first controllable valve.

17. An apparatus according to claim 1, wherein the control pressure in the apparatus is the pressure in the chamber; and wherein the controller receives at its input a third signal representing a desired pressure in the chamber; and wherein the controller produces the first signal as a function of the second signal, the third signal, and a proportional-integral-derivative control rule.

18. An apparatus according to claim 17, wherein the proportional-integral-derivative control rule comprises a proportional gain, an integral gain, and a derivative gain.

19. An apparatus according to claim 18, wherein the derivative gain of the proportional-integral-derivative control rule is zero.

20. An apparatus according to claim 1, wherein the controller comprises:

a control rule having at least one gain, the control rule for producing the first signal; and a gain scheduler for determining the at least one gain of the control rule.

21. An apparatus according to claim 20, wherein the control pressure in the apparatus is a desired pressure in the chamber;

wherein the gain scheduler comprises a plurality of gains; and wherein the gain scheduler selects the at least one gain from the plurality of gains according to the second signal.

22. An apparatus according to claim 1, wherein the control pressure in the apparatus is a desired pressure in the chamber; and wherein the controller produces the first signal as a function of a comparison between the second signal and a threshold value.

23. An apparatus according to claim 1, wherein the control pressure in the apparatus is the pressure in the chamber, a desired pressure in the chamber, the exhaust pressure at the exhaust side of the first vacuum pump, or the internal pressure at the compression stage of the first vacuum pump.

24. A method for regulating a pressure in a chamber, wherein a first vacuum pump has a compression stage, an exhaust side, and an intake side communicating directly with the chamber, comprising the steps of:

generating a first pressure in the chamber with the first vacuum pump; and controlling an exhaust pressure at the exhaust side of the first vacuum pump or an internal pressure at the compression stage of the first vacuum pump as a function of a control pressure in the apparatus to thereby regulate the pressure in the chamber.

25. A method according to claim 24, wherein a second vacuum pump having an intake side is coupled to the exhaust side of the first vacuum pump, and further comprising the step of:

generating a second pressure, higher than the first pressure, at the intake side of the second vacuum pump.

26. A method according to claim 25, wherein a roots vacuum pump couples the first and second vacuum pumps and has a variable rotational frequency, and wherein controlling the exhaust pressure comprises varying the variable rotational frequency of the roots vacuum pump.

27. A method according to claim 25, wherein a controllable valve couples the first and second vacuum pumps, and wherein the step of controlling comprises opening and closing the controllable valve.

28. A method according to claim 25, wherein the second vacuum pump has a variable rotational frequency, and wherein the step of controlling comprises varying the variable rotational frequency of the second vacuum pump.

29. A method according to claim 24, wherein the first pressure generated by the first vacuum pump is less than atmospheric pressure;

wherein the exhaust pressure of the first vacuum pump is at atmospheric pressure;

wherein the first vacuum pump has a variable rotational frequency; and wherein the step of controlling comprises varying the variable rotational frequency of the first vacuum pump.

30. A method according to claim 24, wherein a controllable valve has an intake side coupled to a gas supply and an exhaust side coupled to the exhaust side of the first vacuum pump, and wherein the step of controlling comprises opening and closing the controllable valve.

31. A method according to claim 30, wherein a vacuum pump has a variable rotational frequency, an exhaust side, and an intake side coupled to the exhaust sides of the first vacuum pump and the controllable valve, and wherein the step of controlling further comprises varying the variable rotational frequency of the vacuum pump.

32. A method according to claim 24, wherein controllable valve has an intake side coupled to a gas supply and an exhaust side coupled to the compression stage of the first vacuum pump, and wherein the step of controlling comprises opening and closing the controllable valve.

33. A method according to claim 24, wherein a controllable valve has an intake side coupled to the compression stage of the first vacuum pump and an exhaust side coupled to the exhaust side of the first vacuum pump, and wherein the step of controlling comprises opening and closing the controllable valve.

34. A method according to claim 24, wherein the first vacuum pump has a second compression stage, and wherein a controllable valve has an intake side coupled to the compression stage of the first vacuum pump and an exhaust side coupled to the second compression stage of the first vacuum pump, and wherein the step of controlling comprises opening and closing the controllable valve.

35. A method according to claim 24, wherein controllable valve has an intake side coupled to the compression stage of the first vacuum pump and an exhaust side coupled to the intake side of the first vacuum pump, and wherein the step of controlling comprises opening and closing the controllable valve.

36. A method according to claim 24, wherein a controllable valve has an intake side coupled to the intake side of the first vacuum pump and an exhaust side coupled to the exhaust side of the first vacuum pump, and wherein the step of controlling comprises opening and closing the controllable valve.

37. A method according to claim 24, wherein a second vacuum pump has an intake side coupled to the exhaust side of the first vacuum pump;

wherein a first controllable valve has an intake side coupled to the compression stage of the first vacuum pump and an exhaust side; and wherein a second controllable valve couples the first and second vacuum pumps and has an intake side coupled to the exhaust side of the first vacuum pump and an exhaust side coupled to the intake side of the second vacuum pump and the exhaust side of the first controllable valve; and wherein the step of controlling comprises opening and closing the first and second controllable valves.

38. A method according to claim 24, wherein the control pressure in the apparatus is the pressure in the chamber; and wherein the step of controlling comprises controlling the exhaust pressure at the exhaust side of the first vacuum pump or the internal pressure at the compression stage of the first vacuum pump as a function of the control pressure in the apparatus, a desired pressure in the chamber, and a proportional-integral-derivative control rule.

39. A method according to claim 38, wherein the proportional-integral-derivative control rule comprises a proportional gain, an integral gain, and a derivative gain.

40. A method according to claim 39, wherein the derivative gain of the proportional-integral-derivative control rule is zero.

41. A method according to claim 24, wherein the control pressure in the apparatus is the pressure in the chamber; and wherein the step of controlling comprises:
selecting at least one gain from a plurality of gains according to the control pressure in the apparatus;
controlling the exhaust pressure at the exhaust side of the first vacuum pump or the internal pressure at the compression stage of the first vacuum pump as a function of a control rule, the selected at least one gain, the control pressure of the apparatus, and a desired pressure in the chamber.

42. A method according to claim 24, wherein the control pressure in the apparatus is a desired pressure in the chamber; and wherein the step of controlling comprises controlling the exhaust pressure at the exhaust side of the first vacuum pump or the internal pressure at the compression stage of the first vacuum pump as a function of the control pressure in the apparatus and a comparison between the control pressure in the apparatus and a threshold value.

43. A method according to claim 24, wherein the control pressure in the apparatus is the pressure in the chamber, a desired pressure in the chamber, the exhaust pressure at the exhaust side of the first vacuum pump, or the internal pressure at the compression stage of the first vacuum pump.

* * * * *